(12) United States Patent
Lee

(10) Patent No.: US 9,416,816 B2
(45) Date of Patent: Aug. 16, 2016

(54) DAMPER FOR DRIVE SHAFT OF VEHICLE

(71) Applicant: Hyundai Motor Company, Seoul (KR)

(72) Inventor: Won Goo Lee, Chuncheon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/475,297

(22) Filed: Sep. 2, 2014

(65) Prior Publication Data

US 2015/0111652 A1   Apr. 23, 2015

(30) Foreign Application Priority Data

Oct. 17, 2013 (KR) .......................... 10-2013-0123864

(51) Int. Cl.
| | |
|---|---|
| *F16F 15/10* | (2006.01) |
| *F16C 3/02* | (2006.01) |
| *F16F 1/387* | (2006.01) |
| *F16F 15/126* | (2006.01) |

(52) U.S. Cl.
CPC ............... *F16C 3/023* (2013.01); *F16F 1/3876* (2013.01); *F16F 15/10* (2013.01); *F16F 15/126* (2013.01); *Y10T 464/50* (2015.01)

(58) Field of Classification Search
CPC .......... F16C 3/023; F16C 27/06; F16F 7/104; F16F 7/108; F16F 1/38; F16F 1/3876; F16F 1/3835; F16F 1/3735; F16F 15/1435; F16F 15/1442; F16F 15/10; F16F 15/12; F16F 15/14; Y10T 464/50
See application file for complete search history.

(56) References Cited

U.S. PATENT DOCUMENTS

| | | | |
|---|---|---|---|
| 5,884,902 A | 3/1999 | Hamada et al. | |
| 2004/0148980 A1* | 8/2004 | Kim ...................... | F16F 7/082 68/23 R |

FOREIGN PATENT DOCUMENTS

| | | | | |
|---|---|---|---|---|
| DE | 3940366 A1 | * | 6/1991 | .......... F16F 15/1442 |
| JP | 06-159434 A | | 6/1994 | |
| JP | 2004-028124 A | | 1/2004 | |
| KR | 10-2004-0069874 A | | 8/2004 | |
| KR | 10-2008-0054822 A | | 6/2008 | |
| KR | 10-2012-0044601 A | | 5/2012 | |
| KR | 10-2013-0004782 A | | 1/2013 | |

OTHER PUBLICATIONS

Electronic Translation of DE 39 40 366 A1.*

\* cited by examiner

*Primary Examiner* — Anna Momper

(74) *Attorney, Agent, or Firm* — Morgan, Lewis & Bockius LLP

(57) ABSTRACT

A damper for a drive shaft of a vehicle, which is installed to a predetermined position of the drive shaft for transmitting torque of an engine to a driven wheel, may include a bimetal or a metallic member corresponding to the bimetal; and a hollow body molded of a rubber material to surround the bimetal or the metallic member.

11 Claims, 5 Drawing Sheets

<Principle of dynamic damper>

(a)

<Property of dynamic damper>

(b)

<Section of damper>

(b)

DAMPER FOR DRIVE SHAFT OF VEHICLE

CROSS-REFERENCE TO RELATED APPLICATION

The present application claims priority to Korean Patent Application No. 10-2013-0123864 filed on Oct. 17, 2013, the entire contents of which is incorporated herein for all purposes by this reference.

BACKGROUND

1. Field of the Invention

The present invention relates to a damper for a drive shaft of a vehicle. More particularly, the present invention relates to a damper for a drive shaft of a vehicle having a structure by which the natural frequency is varied with temperature, thereby attenuating vibration in the overall frequency range.

2. Description of Related Art

In general, a drive shaft installed in a vehicle, which is a component for transmitting the torque of an engine to the driven wheels, includes a shaft having a predetermined length and a constant velocity joint for connection with the driven wheels.

Peripheral components such as an engine, a transmission, wheels and suspension are place near the drive shaft, so that the vibrations of the peripheral components have an effect on the drive shaft.

Thus, when the drive shaft is designed, it is based to avoid the natural frequencies of the transmission, engine, wheels and suspension.

When the drive shaft is rotated at high speed (i.e., driven at high speed), due to an additional vibration according to the rotation of the drive shaft, the drive shaft resonates with the peripheral components so that booming noise is generated. Thus, in order to avoid the resonance phenomenon to remove the booming noise, a dynamic damper is installed to the drive shaft.

Hereinafter, the function of the dynamic damper will be described in detail with reference to FIG. 1.

The drive shaft 1 may be divided into a left part LH and a right part RH with respect to the transmission. Since the drive shaft 1 leans toward one side with respect to a differential of the transmission, the length of the right part RH of the drive shaft is relatively longer than that of the left part of the drive shaft and the frequency band of the natural vibration is adjusted to a low band due to the bending phenomenon.

As the driving speed of a vehicle is increased, the frequency band is increased. When the natural frequency of the right part of the drive shaft is equal to the frequency of the vehicle (e.g., 4-cylinder: Engine C2 frequency), the resonant phenomenon occurs to generate the booming noise.

Thus, a hollow shaft has been developed and used to increase the natural frequency of the right part of the drive shaft, so that the fabrication process is complicated and the cost is increased. Therefore, in most of vehicles, a dynamic damper 2 is mounted on the drive shaft to improve the noise, vibration, and harshness (NVH) performance.

That is, the vibration of the drive shaft is attenuated at a specific frequency by using the dynamic damper, so that the resonance with the peripheral components is avoided and at the same time, the booming noise is removed, so that the durability and NVH performance of the vehicle can be improved.

For reference, the principle and property of the dynamic damper are shown in FIG. 2A. In the dynamic damper, mass m2 is added to mass m1 to reduce the amplification of vibration, so that the vibration amplification may be reduced at a target frequency (the resonant frequency of m1) based on the principle (response in using the damper in FIG. 2B) of applying an opposite phase vibration having the target frequency to reduce the amplitude. However, the natural frequency of the damper is not resistant to surrounding environment such as temperature or humidity.

As shown in FIG. 3A, the dynamic damper for a vehicle includes a steel mass and a hollow body which is molded of a rubber material such as natural rubber or styrene-butadiene rubber blend and surrounds the steel mass.

The natural frequency of the dynamic damper is varied with the mass (m) and bridge shape (shape of an interface between both ends of the steel mass and the hollow body) of the inner material and the rigidity (k) according to the matter property of the rubber material constituting the hollow body.

However, although the drive shaft on which the damper is mounted is closed to an engine so that the range of temperature variation is great, as shown in FIG. 3B, the rubber material constituting the hollow body of the damper is changed in the matter property such as hardness or elasticity according to the temperature variation.

In addition, the hardness of the dynamic damper is varied according to the variations of the bridge shape and the matter property of rubber material according to the temperature variation, so that the natural frequency is not constant, decreasing the natural frequency as shown in FIG. 3C.

That is, as the temperature is increased, although the mass of the damper is not changed, the spring constant (k) of the rubber is lowered so that the natural frequency of the dynamic damper is reduced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a damper for a drive shaft of a vehicle which includes a dynamic damper having a natural frequency varied with the temperature by using a bimetal varied in a shape with the temperature and a rubber material constituting a body of the dynamic damper and surrounding the bimetal, so that the variable resonant frequency range can be avoided and the effect of attenuating the vibration can be achieved.

In an aspect of the present invention, a damper for a drive shaft of a vehicle, which is installed to a predetermined position of the drive shaft for transmitting torque of an engine to a driven wheel, may include a bimetal or a metallic member corresponding to the bimetal, and a hollow body molded of a rubber material to surround the bimetal or the metallic member.

The bimetal may include a single bimetal in which first and second metals having mutually different thermal expansion coefficients are joined with each other to form the single bimetal.

The first metal having a thermal expansion coefficient less than a thermal expansion coefficient of the second metal is disposed at an inner side than the second metal.

The damper may further include a bridge part and wherein the first metal is disposed adjacent to the bridge part and the second metal is disposed away from the bridge part.

The first metal having a thermal expansion coefficient less than a thermal expansion coefficient of the second metal is disposed at an outer side than the second metal.

The damper may further include a bridge part and wherein the second metal is disposed adjacent to the bridge part and the first metal is disposed away from the bridge part.

The bimetal may include two dual bimetals or more, each of which may include a pair of first and second metals having mutually different thermal expansion coefficients and joined with each other.

The two dual bimetals may include a first single bimetal including a first metal having a thermal expansion coefficient less than a thermal expansion coefficient of a second metal, wherein the first metal is disposed at an inner side than the second metal, and a second single bimetal including a first metal having a thermal expansion coefficient less than a thermal expansion coefficient of a second metal, wherein the first metal of the second single bimetal is disposed at an outer side than the second metal of the second single bimetal, wherein the first single bimetal is disposed to an inner side than the second single bimetal.

The damper may further include a bridge part wherein the first single bimetal is disposed adjacent to the bridge part and the second single bimetal is disposed away from the bridge part.

The first metal is formed of cast iron and the second metal is formed of aluminum.

The first metals of the first and second single bimetals are formed of cast iron and the second metals of the first and second single bimetals are formed of aluminum.

As described above, the present invention has the following advantages.

According to the present invention, the dynamic damper, which includes a bimetal varied in a shape with the temperature and a body of a rubber material surrounding the bimetal, is provided so that the vibration attenuation can be obtained in the entire frequencies and the variation of the natural frequency according to the variation of temperature can be reduced. In addition, the natural frequency can be rigidly maintained even when the temperature is varied.

Further, the vibration isolation is improved so that the durability of the drive shaft is improved. The NVH performance of a vehicle can be improved by preventing the booming noise due to the driving at the high speed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
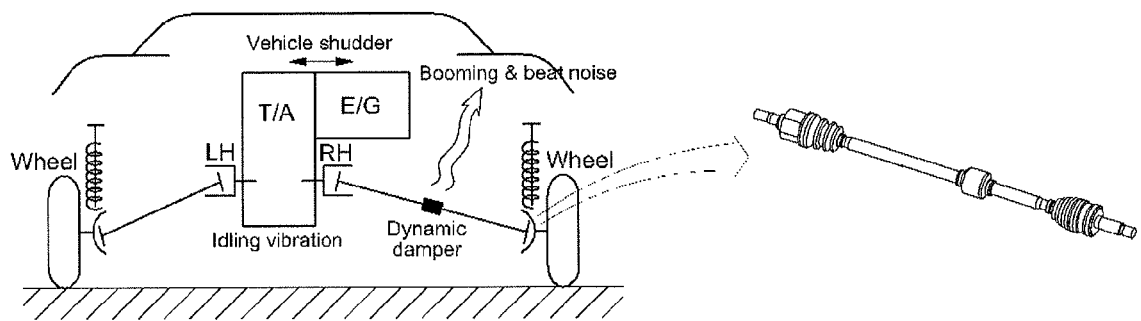
FIG. 1 is a schematic view showing a damper installed to a drive shaft according to the related art.
Figure 2A:
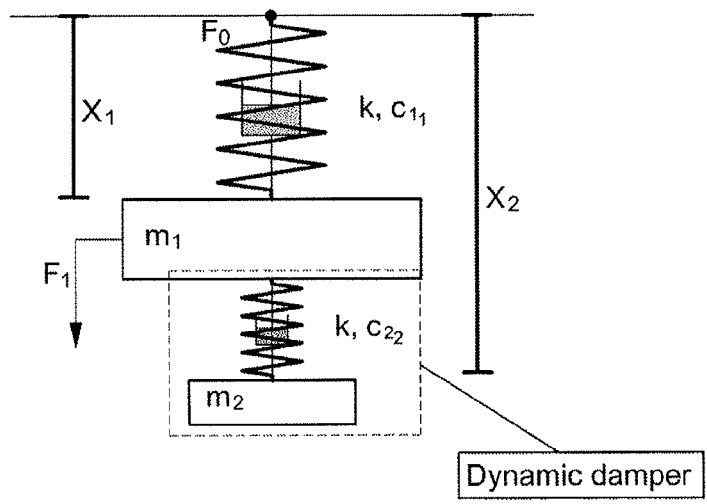
FIG. 2A and FIG. 2B are views illustrating the principle and property of a dynamic damper installed to a drive shaft according to the related art.
Figure 2B:
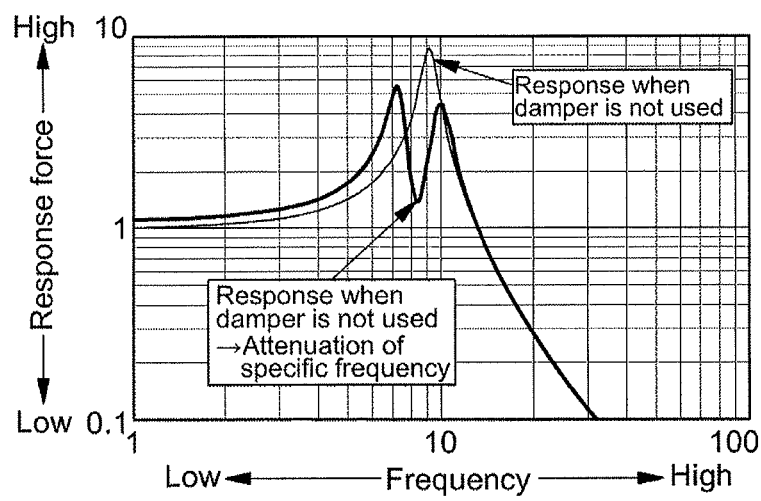
Figure 3A:
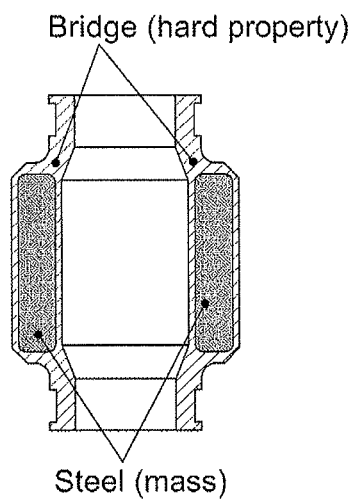
FIG. 3A is a view illustrating the structure of a damper according to the related art.
Figure 3B:
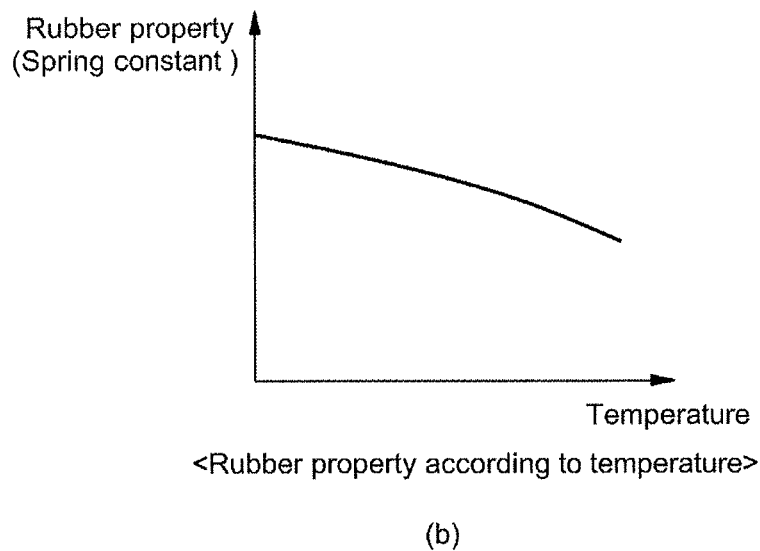
FIG. 3B and FIG. 3C are graphs illustrating the temperature property of a damper according to the related art.
Figure 3C:
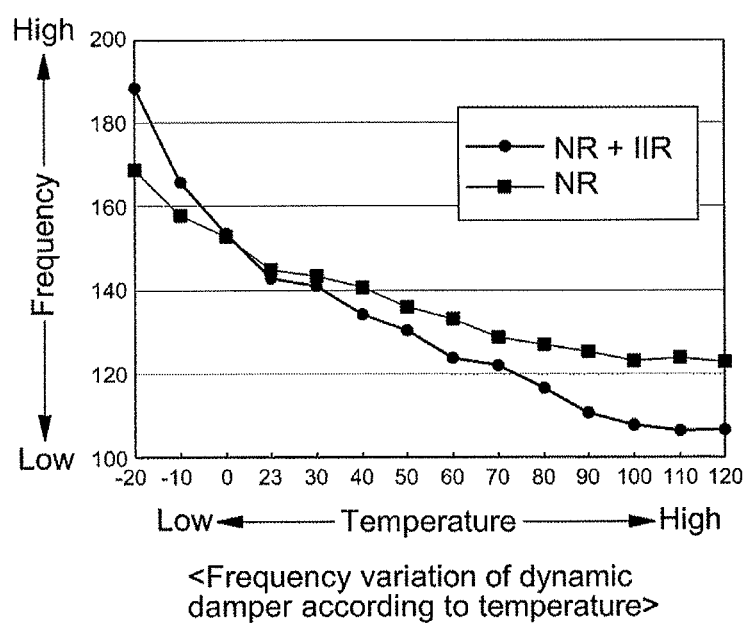

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a preferable embodiment of the present invention will be described in detail with reference to accompanying drawings.

The present invention provides a dynamic damper which includes a bimetal variable in a shape due to the thermal expansion according to temperature and a hollow body formed of a rubber material to surround the bimetal through a molding scheme, so that the natural frequency is varied according to the variation of temperature.

The damper, which is mounted on a predetermined location of the drive shaft for transmitting torque to driven wheels, a bimetal 100 in which metals having mutually different expansion coefficients are joined together, and a hollow body 200 which is formed of a rubber material to surround the bimetal through a molding scheme. When the damper is installed to the drive shaft, an inner surface of the hollow body 200 makes contact with an outer surface of the drive shaft.

As shown in FIG. 4, the bimetal 100 according to the first embodiment of the present invention includes a single bimetal 110 in which first and second metals 101 and 102 having mutually different thermal expansion coefficients are bonded to each other. The single bimetal 110 is molded and enclosed by the hollow body 200 made of a rubber material.

In this case, a bridge part 210 of the hollow body is formed in the interface between both ends of the single bimetal 110 and both ends of the hollow body 200.

Preferably, the first metal 101 having a thermal expansion coefficient less than that of the second metal 102 is disposed at an inner side than the second metal 102. That is, the second metal 102 having a thermal expansion coefficient greater than that of the first metal 101 is disposed at an outer side than the first metal 101 (see FIG. 4A).

Similarly, the first metal 101 having a thermal expansion coefficient less than that of the second metal 102 is disposed at an outer side than the second metal 102. That is, the second metal 102 having a thermal expansion coefficient greater than that of the first metal 101 is disposed at an inner side than the first metal 101 (see FIG. 4B)

Thus, when the high temperature is transferred from the engine and transmission to the drive shaft and at the same time, has an effect on the damper installed to the drive shaft, since the single bimetal 110 is surrounded by the hollow body while being thermal-expanded according to the variation of temperature, the single bimetal 110 is bent while extending in the longitudinal direction thereof.

Figure 4A:
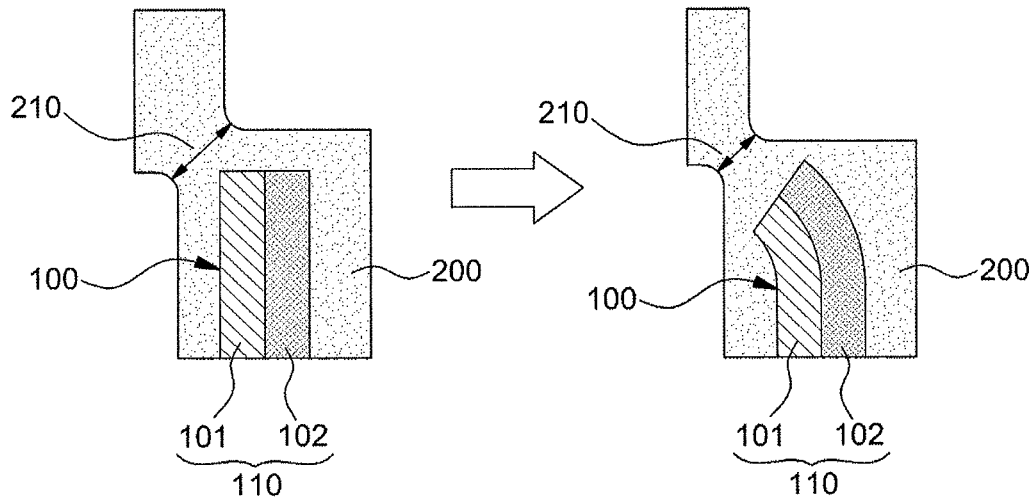
FIG. 4A and FIG. 4B are schematic sectional views showing a damper for a drive shaft according to the various exemplary embodiments of the present invention.
Figure 4B:
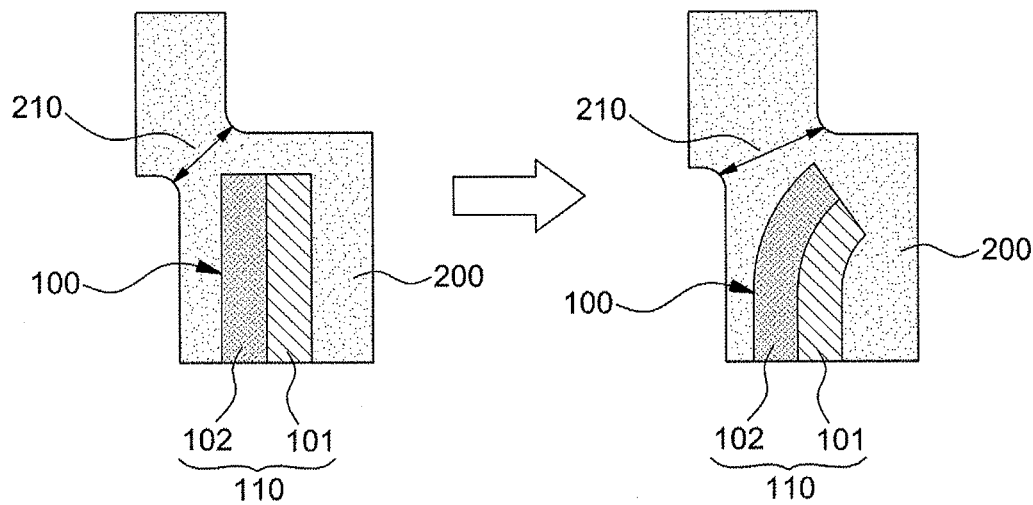

Since the thermal expansion coefficients of the first and second metals 101 and 102 are different from each other, as shown in FIG. 4A, the first and second metals 101 and 102 are bent toward the inside of the damper or the outside of the damper, so that the height and sectional area of the bridge part 210 of the hollow body 200 is varied to compensate the spring constant of the hollow body 200 reduced due to the rubber property. In addition, the bending direction of the bimetal corresponds to the direction of increasing the spring constant.

According to the second embodiment of the present invention, the bimetal 100 may include two dual bimetal 120, each of which includes a pair of first and second metals 101 and 102 having mutually different thermal expansion coefficients and joined with each other.

Figure 5:
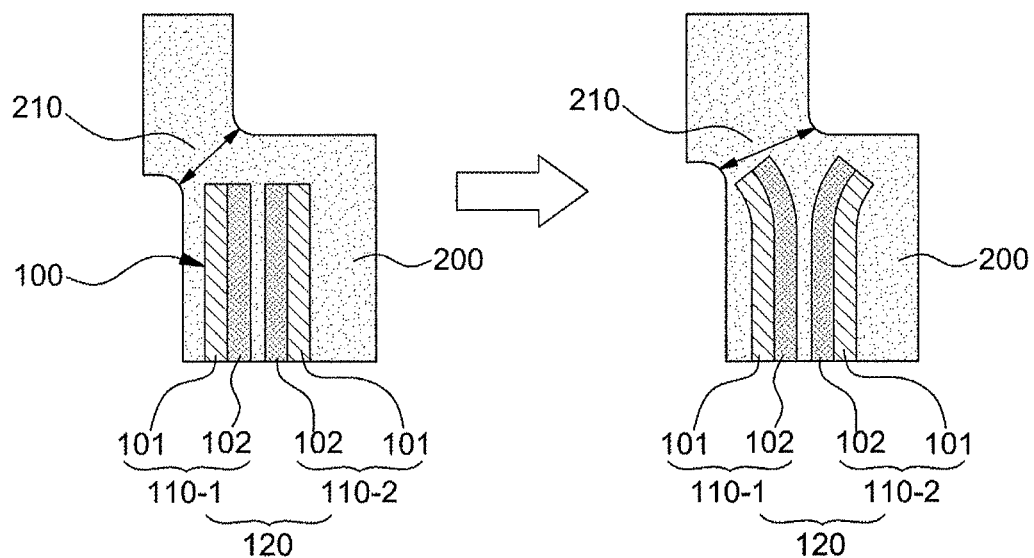
FIG. 5 is a schematic sectional view showing a damper for a drive shaft according to the various exemplary embodiments of the present invention.

As shown in FIG. 5, first and second single bimetals 110-1 and 110-2 are embedded in the hollow body 200 in parallel and extend in the longitudinal direction according to the variation of temperature to change the height and sectional area of the bridge part 210 of the hollow body 200.

Preferably, the first single bimetal 110-1 is disposed to at inside of the damper and the second single bimetal 110-2 is disposed at an outside of the damper.

In this case, a first metal 101 of the first single bimetal 110-1, which has a thermal expansion coefficient less than that of a second metal 102 of the first single bimetal 110-1, is disposed at an inner side of the damper than the second metal 102 of the first single bimetal 110-1. To the contrary, a first metal 101 of the second single bimetal 110-2, which has a thermal expansion coefficient less than that of a second metal 102 of the second single bimetal 110-2, is disposed at an outer side than the second metal 102 of the second single bimetal 110-2.

According to the second embodiment, when the temperature has an effect on the damper, since the first and second single bimetals 110-1 and 110-2 thermal-expand according to the variation of temperature and are surrounded by the hollow body, the first single bimetal 110-1 is bent toward the inside of the damper and the first single bimetal 110-1 is bent toward the outside of the damper while the first and second single bimetals 110-1 and 110-2 extend in the longitudinal direction.

As described above, the sectional area and height of the bridge part 210 may be varied according to the variation of the bimetal.

Conventionally, the natural frequency of the dynamic damper is varied according to a shape of the bridge part of the hollow body, the hardness k of the matter property of the rubber material, and the mass m of the inner mass material.

In this case, if the bridge part has a simply hexahedron shape, the hardness according to the shape of the bridge part is varied according to the following equation:

$$k = A/L * E$$

Where L is a bridge height, A is a sectional area and E is an elastic modulus.

Thus, as the temperature is increased, the size of the rubber material (natural rubber and styrene-butadiene rubber blend) of the hollow body of the dynamic damper is reduced and in addition, the bimetal is bent to vary the sectional area and height of the bridge part 210, so that the hardness k of the damper is varied to maintain the natural frequency of the damper.

For reference, since the rubber is an incompressible material, the variation of the length of the bridge may occur simultaneously together with the variation of the sectional area thereof.

When it is assumed that the first metal 101 is made of cast iron and the second metal 102 is made of aluminum, the linear expansion length of the bimetal and the variation amount of the sectional area of the bridge part are obtained as follows.

Conventionally, when the linear expansion coefficient is $\beta$, the linear expansion length l is expressed in the equation shown below:

$$l = l(l + \beta t)$$

wherein l is a linear expansion length, l is a length before the variation, $\beta$ is a linear expansion coefficient, and t is temperature.

Thus, when the temperature is changed as much as 120° C. and the second metal of aluminum ($\beta = 2.38 \times 10^{-5}$) and the first metal of cast iron ($\beta = 1.02 \times 10^{-5}$) are used for the bimetal, the linear expansion coefficient is obtained as follows.

Aluminum: $50 \times (1 + 2.38 \times 10^{-5} \times 120) = 50.1428$ mm

Cast iron: $50 \times (1 + 1.02 \times 10^{-5} \times 120) = 50.0612$ mm

After all, as the aluminum is increased, the variation rate of the damper part (5×5×5) of the damper is increased by about 1.6%.

In this case, since the hardness k is inversely proportional to the height and is proportional to the sectional area ($k \propto A/L$), the hardness due to the shape of the varied bridge part is $k \propto (1.016^2 \, A)/(0.984 \, L) = 1.05 \, AL$, so that the hardness is increased by about 5% when compared with that in the initial state.

Actually, although the variation rate of the natural frequency due to the temperature variation (120° C.) of the damper made of rubber is changed from 170 to 120, that is, about 29%, when the length of the damper mass is increased about 6 times (300 mm) of the current length (width is reduced), the variation rate of the natural frequency is reduced.

As described above, the dynamic damper, which includes a bimetal varied in a shape with the temperature and a body of a rubber material surrounding the bimetal, is provided so that the vibration attenuation can be obtained in the entire frequencies and the variation of the natural frequency according to the variation of temperature can be reduced. In addition, the natural frequency can be rigidly maintained even when the temperature is varied For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A damper for a drive shaft of a vehicle, which is installed to a predetermined position of the drive shaft for transmitting torque of an engine to a driven wheel, the damper comprising:
   a bimetal including first and second metals having different thermal expansion coefficients and joined with each other to form a single bimetal; and
   a hollow body molded of an elastomer surrounding the bimetal.

2. The damper of claim 1, wherein the first metal having a thermal expansion coefficient less than a thermal expansion coefficient of the second metal is disposed at an inner side of the second metal.

3. The damper of claim 2, further including a bridge part and wherein the first metal is disposed adjacent to the bridge part and the second metal is disposed away from the bridge part.

4. The damper of claim 1, wherein the first metal having a thermal expansion coefficient less than a thermal expansion coefficient of the second metal is disposed at an outer side of the second metal.

5. The damper of claim 4, further including a bridge part and wherein the second metal is disposed adjacent to the bridge part and the first metal is disposed away from the bridge part.

6. The damper of claim 1, wherein the bimetal includes at least two bimetals or more, and wherein each of the at least two bimetals includes a pair of first and second metals having mutually different thermal expansion coefficients and joined with each other.

7. The damper of claim 6, wherein the at least two bimetals include:
   a first single bimetal including a first metal having a thermal expansion coefficient less than a thermal expansion coefficient of a second metal, wherein the first metal is disposed at an inner side of the second metal; and
   a second single bimetal including a first metal having a thermal expansion coefficient less than a thermal expansion coefficient of a second metal, wherein the first metal of the second single bimetal is disposed at an outer side of the second metal of the second single bimetal,
   wherein the first single bimetal is disposed to an inner side of the second single bimetal.

8. The damper of one of claim 7, wherein each of the first metals of the first and second single bimetals is formed of cast iron and each of the second metals of the first and second single bimetals is formed of aluminum.

9. The damper of claim 6, further including a bridge part wherein the first single bimetal is disposed adjacent to the bridge part and the second single bimetal is disposed away from the bridge part.

10. The damper of one of claim 1, wherein the first metal is formed of cast iron and the second metal is formed of aluminum.

11. A damper for a drive shaft of a vehicle, which is installed to a predetermined position of the drive shaft for transmitting torque of an engine to a driven wheel, the damper comprising:
    a bimetal including first and second metals having different thermal expansion coefficients and joined with each other to form the bimetal;
    a hollow body molded of an elastomer surrounding the bimetal; and
    a bridge part of the hollow body, wherein the bridge part is formed in an interface between both distal ends of the bimetal and both ends of the hollow body.

\* \* \* \* \*